United States Patent [19]

Chen et al.

[11] Patent Number: 5,783,614
[45] Date of Patent: Jul. 21, 1998

[54] POLYMERIC-COATED DIELECTRIC PARTICLES AND FORMULATION AND METHOD FOR PREPARING SAME

[75] Inventors: Jing Hong Chen, Bethlehem, Pa.; Frederic E. Schubert, Shoreham; Wei-Hsin Hou, Setauket, both of N.Y.

[73] Assignee: Copytele, Inc., Huntington Station, N.Y.

[21] Appl. No.: 803,716

[22] Filed: Feb. 21, 1997

[51] Int. Cl.$^6$ .................................................. C08K 9/04
[52] U.S. Cl. ........................ 523/205; 428/407; 524/805
[58] Field of Search ........................ 523/205; 524/805; 428/407

[56] References Cited

U.S. PATENT DOCUMENTS

| | | | |
|---|---|---|---|
| 3,970,627 | 7/1976 | Seymus | 524/546 |
| 4,169,083 | 9/1979 | Vassiliou | 524/546 |
| 4,285,801 | 8/1981 | Chiang . | |
| 4,478,965 | 10/1984 | Concannon | 523/218 |
| 4,914,146 | 4/1990 | Honda | 524/546 |
| 5,360,689 | 11/1994 | Hou et al. . | |
| 5,380,362 | 1/1995 | Schubert . | |
| 5,397,669 | 3/1995 | Rao | 524/462 |
| 5,403,518 | 4/1995 | Schubert . | |
| 5,411,656 | 5/1995 | Schubert . | |
| 5,498,674 | 3/1996 | Hou et al. . | |
| 5,573,711 | 11/1996 | Hou et al. . | |

OTHER PUBLICATIONS

Vincent, et al., J.C.S. Faraday 1, 1980, 76, 665–673, Adsorption of Small, Positive Particles Onto Large, Negative Particles in The Presence of Polymer, Jun. 6, 1979.

*Primary Examiner*—Paul R. Michl
*Attorney, Agent, or Firm*—Plevy & Associates

[57] ABSTRACT

Properly-coated pigment particles for use in an electrophoretic display include pigment particles having a predetermined density and application of a polymeric coating to the pigment particles, wherein the coating comprises a near fluoropolymer, and wherein the density of the fluoropolymer is substantially the same as the density of the pigment particles. When a polymeric coating is applied having a density that is substantially the same as the density of the pigment particles, even though the particles comprise a distribution of particle sizes, the density of the pigment particles is not significantly altered. In a preferred embodiment, the pigment particle comprises a diarylide yellow pigment, having a density of 1.43 g/ml, coated with a polymer made from the monomer 2,3,4,5,6-Pentafluorostyrene, having a density of 1.41 g/ml.

19 Claims, 1 Drawing Sheet

POLYMERIC-COATED DIELECTRIC PARTICLES AND FORMULATION AND METHOD FOR PREPARING SAME

FIELD OF THE INVENTION

The present invention relates to dielectric pigment particles coated with a fluorinated polymer for use in electrophoretic image displays, electrostatic printing, or the like, and a corresponding formulation and method for producing the same.

BACKGROUND OF THE INVENTION

The electrophoretic effect is well known, and the prior art is replete with a number of patents and articles which describe the effect. As will be recognized by a person skilled in the art, the electrophoretic effect operates on the principle that certain particles, when suspended in a medium, can be electrically charged and thereby caused to migrate through the medium to an electrode of opposite charge. Electrostatic printing and electrophoretic image displays (EPID) use the electrophoretic effect to produce desired images. For an example of devices using the electrophoretic effect, reference is made to U.S. Pat. No. 4,732,830, issued to Frank J. DiSanto et al., on Mar. 22, 1988, entitled ELECTROPHORETIC DISPLAY PANELS AND ASSOCIATED METHODS, and assigned to Copytele, Inc., the assignee herein.

In prior art EPIDs, dielectric particles are suspended in a fluid medium that is either clear or of an optically-contrasting color as compared with the dielectric particles. To effect the greatest optical contrast between the particles and the suspension medium, it is desirable to have either light-colored particles suspended in a dark medium or black particles suspended in a backlighted clear medium. A variety of pigment particle and dispersion medium compositions are known in the art. See, for example, U.S. Pat. No. 4,298,444, issued to K. Muller, et al., on Nov. 3, 1981, entitled ELECTROPHORETIC DISPLAY.

In the prior art, it has been proven difficult to produce black electrophoretic particles that are dielectric, of uniform size, and have a density matching that of a common suspension medium. As a result, EPIDs commonly use readily-manufactured light colored electrophoretic pigment particles suspended in media which contain dark color dyes. Such EPIDs are exemplified in U.S. Pat. No. 4,655,897 to DiSanto et al.; U.S. Pat. No. 4,093,534 to Carter et al.; U.S. Pat. No. 4,298,448 to Muller et al.; and U.S. Pat. No. 4,285,801 to Chiang. The use of a yellow pigment particle is disclosed in the following patents, all of which issued to Frederic E. Schubert and are assigned to Copytele, Inc., the assignee herein: U.S. Pat. No. 5,380,362, issued Jan. 10, 1995, entitled SUSPENSION FOR USE IN ELECTROPHORETIC IMAGE DISPLAY SYSTEMS; U.S. Pat. No. 5,403,518, issued Apr. 4, 1995, entitled FORMULATIONS FOR IMPROVED ELECTROPHORETIC DISPLAY SUSPENSIONS AND RELATED METHODS; and U.S. Pat. No. 5,411,656, issued May 2, 1995, entitled GAS ABSORPTION ADDITIVES FOR ELECTROPHORETIC SUSPENSIONS. These three patents are incorporated herein by reference.

As will be recognized by a person skilled in the art, the selection of the electrophoretic particles used in the EPID is very important in determining performance of the EPID and the quality of the image produced. Ideally, electrophoretic particles should have an optimum charge-to-mass ratio, which is dependent upon the particle size and surface charge; the optimum charge-to-mass ratio is desirable to obtain good electrostatic deposition at high velocity as well as rapid reversal of particle motion when voltages change. Also, it is desirable to use electrophoretic particles that have essentially the same density as the fluid medium in which they are suspended. By using electrophoretic particles of essentially the same density as the suspension medium, the migration of the electrophoretic particles through the medium remains independent of both the orientation of the EPID and the forces of gravity. The particles will thus remain randomly dispersed in the fluid medium.

There are advantages to polymerically coating electrophoretic particles for use in the EPID or other electrophoretic devices. A proper coating applied to the particles can have the effect of enhancing the ability of the particles to scatter light. When polymerically-coated particles impinge upon a transparent screen electrode (thereby displacing the fluid medium from the screen), a brighter color and sharper image is produced (as compared with when uncoated particles are used). Additionally, it naturally is desirable to use electrophoretic particles that are stable and resistant to interaction with the suspension medium to improve the efficiency and half-life of the EPID; the suspension medium may comprise, for example, aromatic or aliphatic solvents, including benzenes, toluenes, hydrocarbon oil, novane, decane, or the like, which may react with some typical pigment particles used in EPIDs. Polymerically-coated pigment particles produce a harder and more solvent-resistant composite when compared to uncoated particles.

Furthermore, properly-coated electrophoretic particles can be less apt to adhere to surfaces within the electrophoretic cell. Over recent years, attention has been directed to dispersion stabilization by way of adsorbed polymers on particle surfaces. See, for example, an article by P. Murau and B Singer, appearing in Vol 49, No. 9, of the Journal of Applied Physics (1978), entitled "The Understanding and Elimination of Some Suspension Instabilities in an Electrophoretic Display." See also U.S. Pat. No. 5,403,518, issued to Schubert, referenced above, and U.S. Pat. No. 4,285,801, issued to Anne A. Chiang on Aug. 25, 1981, entitled ELECTROPHORETIC DISPLAY COMPOSITION.

If two colloidal particles coated with adsorbed layers of polymers approach each other, steric repulsion can occur as soon as the polymer layers start to penetrate. According to Murau and Singer, the polymer molecules adsorbed on a colloidal particle never lie flat on the surface. Rather, parts of the long chains of hydrocarbons (loose-ends, side branches, and loops), are free from the surfaces and surrounded by liquid.

It has been discovered that highly-fluorinated polymers are advantageous for use as pigment particle coatings, as they have low critical surface tensions which tend to produce anti-stick properties. See, for example, an article by M. Hudlicry and A. E. Pavlath, appearing in Vol. 187, page 983, of ACS Monograph (1995), entitled "Properties of Fluorinated Compounds II." The lower surface tensions of perfluorinated polymers, when used as a pigment particle coatings, leads to less interaction between the pigment particle surfaces and the solvents comprising the suspension medium in which the particles are dispersed.

There are, however, disadvantages to coating electrophoretic particles. As noted, it is desirable to use electrophoretic particles that have essentially the same density as the fluid medium in which they are suspended. However, since the uncoated pigment particles comprise a fairly broad distribution of particle sizes, a coating of uniform thickness will produce a distribution of particles with varying densities.

Accordingly, it is an object of the present invention to provide polymerically-coated pigment particles in which the density of the coated particles remains substantially the same as the density of the fluid medium in which the particles are suspended. Advantages of this invention include providing properly-coated pigment particles that have an enhanced ability to scatter light to produce a brighter color; are harder, more solvent-resistant composites; and are adhesion-resistant with regard to surfaces within the electrophoretic cell.

SUMMARY OF THE INVENTION

The problems and disadvantages associated with previous methods of coating pigment particles are overcome by the present invention which includes selection of pigment particles having a predetermined density and application of a polymeric coating to the pigment particles, wherein the coating comprises a highly-fluorinated polymer, and wherein the density of the polymer is substantially the same as the density of the pigment particles. When a polymeric coating is applied having a density that is substantially the same as the density of the pigment particles, even though the particles comprise a distribution of particle sizes, the density of the pigment particles is not significantly altered.

In a preferred embodiment, the pigment particle comprises a diarylide yellow pigment, having a density of 1.43 g/ml, coated with a polymer made from the monomer 2,3,4,5,6-Pentafluorostyrene, having a density of 1.41 g/ml. These coated pigment particles preferably may be suspended in a medium comprised of a mixture of tetrachloroethylene and sec-butyl benzene, balanced to a specific gravity of 1.43 g/ml. A method in accordance with the present invention for coating the pigment particles comprises a polymerization technique in which a pentafluorostyrene monomer is polymerized with a free radical polymerization initiator in the presence of the pigment particles dispersed in an organic solvent.

DETAILED DESCRIPTION OF THE INVENTION

Figure 1:
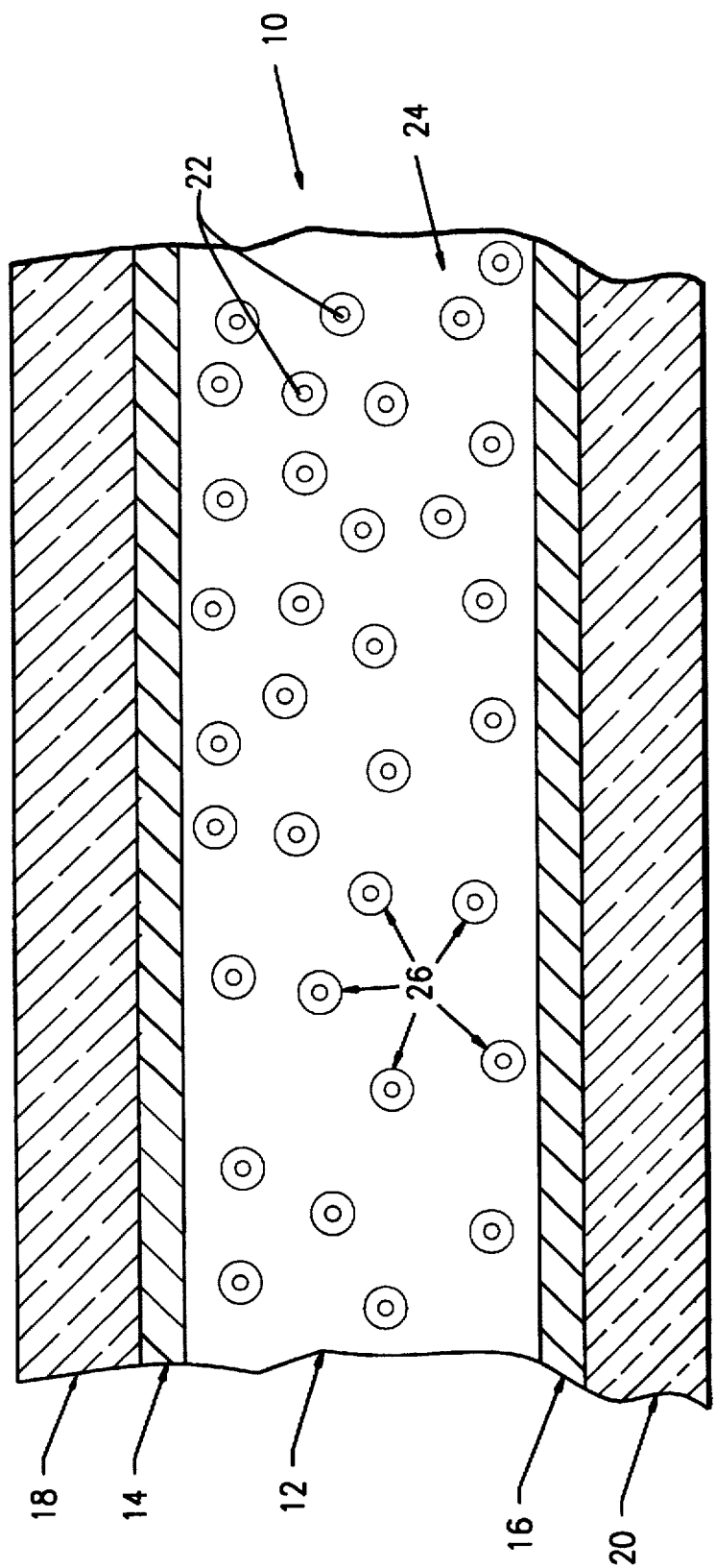
FIG. 1, the sole figure, is a diagrammatic, cross-sectional view of an EPID having particles in accordance with the present invention.

Although the present invention can be used in many different applications where dispersions containing particles with opposite charges are desired, such as paint, ink, and electrostatic toner, it is especially suitable for use in connection with electrophoretic image displays (EPIDs). Accordingly, the present invention will be described in connection with a typical EPID.

Referring to FIG. 1, there is shown a cross-sectional view of a segment of a simple electrophoretic image display 10 magnified to show a single pixel. As will be recognized by a person skilled in the art, an EPID may contain a volume of an electrophoretic dispersion 12 disposed between an anode 14 and a cathode 16. The anode 14 and cathode 16 are deposited upon glass plates 18, 20 in the form of a thin layer of indium-tin-oxide (ITO) or a like compound. The ITO layer is deposited in such a manner as to be substantially transparent when viewed through the glass plates 18, 20.

The electrophoretic dispersion 12 is comprised of a plurality of dielectric electrophoretic particles 22 suspended in a fluid medium 24. The electrophoretic particles 22 have a density substantially equivalent to that of the fluid medium 24 so as to remain randomly dispersed, unaffected by the orientation of the EPID or the effects of gravity. In accordance with the present invention, the particles are covered with a polymeric-coating 26. When a sufficient electrical bias is applied between the anode 14 and the cathode 16, the particles 22 migrate to either the cathode 16 or anode 14, depending on polarity, and they displace the dark color medium adjacent the ITO layer, thereby creating a bright pixel. Reversing the voltage produces a dark pixel.

Any known manner may be used to prepare the pigment particles of the electrophoretic suspension in which the polymeric coating of the present invention is employed. Preferably, a diarylide yellow pigment is selected, which is designated as AAOT yellow, #374-73, manufactured by Sun Chemical Company. This yellow pigment has a density of 1.43 g/ml. In accordance with a preferred embodiment of the present invention, solvents used for the suspension medium 24 are tetrachloroethylene and sec-butyl benzene. The high specific gravity of tetrachloroethylene 1.62 g/ml, allows specific gravity balancing to 1.43 g/ml with the less dense sec-butyl benzene. Thus, the solvent can be balanced to arrive at a specific gravity substantially the same as the density of the pigment particles.

The density of the pigment particles is not significantly changed when the polymeric coating is applied in accordance with the present invention, even when a wide distribution of particle sizes are used. 2,3,4,5,6-Pentafluorostyrene is selected as a monomer to be polymerized and applied as a coating. When this monomer is polymerized, it produces a fluorinated polymer that functions as an effective coating for the pigment particles, with low critical surface tensions. Pentafluorostyrene has a density of 1.41 g/ml, and when used to produce a polymeric coating for the AAOT yellow pigment, #374-73, the coating is approximately the same density as the density of the pigment particles such that particles of uniform density are maintained.

With regard to the process of polymerically coating the pigment particles in accordance with the present invention, alternative polymerization recipes are listed in Tables I and II:

TABLE I

| Materials | Weight(g) |
|---|---|
| Pigment | 1.18 |
| 4,4"-Azobis (4-cyanovaleric acid) | 0.05 |
| Pentafluorostyrene | 0.75 |
| Decane | 30.0 |
| Alcohol | 5.0 |

TABLE II

| Materials | Weight(g) |
|---|---|
| Pigment | 1.18 |
| 4,4"-Azobis (4-cyanovaleric acid) | 0.05 |
| Pentafluorostyrene | 0.50 |
| Sec-Butylbenzene | 30.0 |
| Alcohol | 3.0 |

The materials are mixed in a temperature-controlled tumbler reactor. The reaction mixture tumbles at 32 rpm at 60 degrees Celsius for approximately twenty-four hours and then at 70 degrees Celsius for twelve hours. The resulting coated particles are cleaned by washes with hexane and alcohol. They are then dried in a vacuum oven. By varying the recipes of Table I or Table II, or by varying other reaction parameters of the method of manufacture, the physical characteristics of the coated electrophoretic pigment particles can be selectively altered as desired for a given application.

As noted, the preferred pigment is a diarylide yellow pigment, designated as AAOT yellow, #374-73, as this pigment has a density of 1.43 g/ml, and the preferred monomer, 2,3,4,5,6-Pentafluorostyrene, has a density of 1.41 g/ml. However, one skilled in the art will recognize that other pigment particles and monomers may be used, with the key being that the density of the pigment particles be substantially equivalent to the density of the monomer, and that preferably a polymeric coating be selected having a high-fluorine atom content. Other pigment particles could include, for example, Hansa yellow, Arylide yellow, Hostaperm yellow, Novopern yellow, and any other suitable organic pigment.

Also, one skilled in the art will recognize that other radical polymerization initiators or solvents may be used. 4,4'-Azobis (4-cyanovaleric acid) is preferred as a polymerization initiator; however, other radical polymerization initiators may include 2,2"-azobis (2-methylbutyrontrile), benzoyl peroxide, lauroyl peroxide, octanoyl peroxide, and the like. Hydrocarbon solvents may be substituted for the preferred solvents of decane or sec-butylbenzene, such as phenylxylylethanes, toluene, benzene, xylene, cyclohexane, phenyloctane, octane, and hexadecane decahydronaphthalene.

All equivalents, variations and modifications that can be applied to the described present invention by a person skilled in the art, are intended to be included within the scope of this invention as defined by the appended claims.

We claim:

1. An electrophoretic suspension comprising a plurality of pigment particles having a pre-determined density and suspended in a fluid medium, wherein the pigment particles are coated with polypentafluorostyrene having substantially the same density as the pigment particles.

2. The electrophoretic suspension of claim 1, wherein the pigment particles are selected from the group consisting of Diarylide yellow, Hansa yellow, Arylide yellow, Hostaperm yellow, and Novoperm yellow.

3. The electrophoretic suspension of claim 1, wherein the pigment particles comprise yellow diarylide pigment particles having a density of about 1.43 g/ml.

4. The electrophoretic suspension of claim 1, wherein the monomer is 2,3,4,5,6-Pentafluorostyrene having a density of about 1.41 g/ml.

5. The electrophoretic suspension of claim 3, wherein the fluid medium comprises a mixture of tetrachloroethylene and sec-butyl benzene balanced to a specific gravity of approximately 1.43 g/ml.

6. The electrophoretic suspension of claim 1, wherein the pigment particles comprise yellow diarylide pigment particles having a density of about 1.43 g/ml; and wherein said polymerized pentafluorostyrene monomer is prepared from the polymerization of 2,3,4,5,6-Pentafluorostyrene monomer having a density of about 1.41 g/ml.

7. A formulation for coating pigment particles with polypentafluorostyrene for use in an electrophoretic device, comprising a mixture of:

(a) a plurality of pigment particles having a certain predetermined density;

(b) a radical polymerization initiator;

(c) a pentafluorostyrene monomer having a density substantially equal to the density of the pigment particles; and (d) an organic solvent.

8. The formulation of claim 7, wherein the plurality of pigment particles are selected from the group consisting of Diarylide yellow, Hansa yellow, Arylide yellow, Hostaperm yellow, and Novoperm yellow; wherein the radical polymerization initiator is selected from the group consisting of 4,4'-Azobis (4-cyanovaleric acid), 2,2'-azobis (2-methylbutyronitrile), benzoyl peroxide, lauroyl peroxide, and octanoyl peroxide; and wherein the organic solvent comprises a mixture of aliphatic and aromatic hydrocarbon solvents selected from the group consisting of decane, sec-butylbenzene, phenylxylylethane, toluene, benzene, xylene, cyclohexane, phenyloctane, octane, and hexadecane decahydronaphthalene.

9. The formulation of claim 7, wherein the plurality of pigment particles (a) further comprises approximately 1.18 grams of diarylide yellow pigment having a density of about 1.43 g/ml.

10. The formulation of claim 9, wherein the radical polymerization initiator (b) further comprises approximately 0.02–0.06 grams 4,4'-Azobis (4-cyanovaleric acid).

11. The formulation of claim 10, wherein the pentafluorostyrene monomer© further comprises approximately 0.50–2.00 grams 2,3,4,5,6-Pentafluorostyrene having a density of about 1.41 g/ml.

12. The formulation of claim 11, wherein the organic solvent (d) further comprises a mixture of approximately 30–35 grams decane and 3–7 grams alcohol.

13. The formulation of claim 10, wherein the pentafluorostyrene monomer© further comprises approximately 0.50 grams 2,3,4,5,6-Pentafluorostyrene having a density of about 1.41 g/ml.

14. The formulation of claim 13, wherein the organic solvent (d) further comprises a mixture of approximately 30 grams sec-butylbenzene and 3.0 grams alcohol.

15. A method of coating pigment particles with polypentafluorostyrene for use in an electrophoretic device, comprising the steps of:

(a) combining a mixture of a plurality of pigment particles having a predetermined density; a radical polymerization initiator; a pentafluorostyrene monomer having a density substantially equal to the density of the pigment particles; and an organic solvent; and (b) heating and tumbling the mixture of step (a) such that the pentafluorostyrene monomer is polymerized and coats the pigment particles.

16. The method of claim 15, further comprising the step of cleaning the resulting particles with an organic solvent wash.

17. The method of claim 15, wherein step (a) further comprises combining a mixture of about 1.18 grams yellow diarylide pigment particles having a density of about 1.43 g/ml, 0.05 grams 4,4'-Azobis (4-cyanovaleric acid), 0.75 grams 2,3,4,5,6-Pentafluorostyrene having a density of about 1.41 g/ml; and a mixture of approximately 30 grams decane and 5.0 grams alcohol.

18. The method of claim 15, wherein step (a) further comprises combining a mixture of about 1.18 grams yellow diarylide pigment particles having a density of about 1.43 g/ml, 0.05 grams 4,4'-Azobis (4-cyanovaleric acid), 0.50 grams 2,3,4,5,6-Pentafluorostyrene having a density of about 1.41 g/ml; and a mixture of approximately 30 grams sec-butylbenzene and 3.0 grams alcohol.

19. The method of claim 15, wherein the step of heating and tumbling the mixture further comprises tumbling the mixture at approximately 32 revolutions per minute at about sixty degrees Celsius for twenty-four hours and then at seventy degrees Celsius for twelve hours.

* * * * *